US010050422B2

(12) United States Patent
Duncan

(10) Patent No.: US 10,050,422 B2
(45) Date of Patent: Aug. 14, 2018

(54) WIRING CARRIER

(71) Applicant: LEAR CORPORATION, Southfield, MI (US)

(72) Inventor: Bradley C. Duncan, Harrison Township, MI (US)

(73) Assignee: Lear Corporation, Southfield, MI (US)

(*) Notice: Subject to any disclaimer, the term of this patent is extended or adjusted under 35 U.S.C. 154(b) by 0 days.

(21) Appl. No.: 14/794,055

(22) Filed: Jul. 8, 2015

(65) Prior Publication Data

US 2016/0111864 A1 Apr. 21, 2016

Related U.S. Application Data

(60) Provisional application No. 62/064,058, filed on Oct. 15, 2014.

(51) Int. Cl.
| *H02G 15/076* | (2006.01) |
| *H02G 3/04* | (2006.01) |
| *H02G 3/32* | (2006.01) |
| *B60R 16/02* | (2006.01) |

(52) U.S. Cl.
CPC ............ *H02G 3/04* (2013.01); *B60R 16/0215* (2013.01); *H02G 3/32* (2013.01)

(58) Field of Classification Search
CPC .................................................. B60R 16/0215
USPC ........................................................ 174/72 A
See application file for complete search history.

(56) References Cited

U.S. PATENT DOCUMENTS

| 4,874,908 A | 10/1989 | Johansson |
| 5,730,399 A | 3/1998 | Baginski |
| 5,828,009 A | 10/1998 | James et al. |
| 5,967,857 A | 10/1999 | Okabe |
| 6,180,886 B1 | 1/2001 | Krane et al. |
| 6,274,815 B1 | 8/2001 | Kawaguchi |
| 7,507,906 B2* | 3/2009 | Suzuki ................ H02G 3/32 |
| | | 174/117 F |
| 8,013,248 B2* | 9/2011 | Sakata .............. B60R 16/0215 |
| | | 174/40 CC |
| 2003/0052234 A1 | 3/2003 | Nakagawa et al. |
| 2005/0011687 A1 | 1/2005 | Yamaguchi et al. |
| 2005/0178930 A1 | 8/2005 | Yon |
| 2006/0219423 A1 | 10/2006 | Suzuki et al. |
| 2007/0241241 A1 | 10/2007 | Peterson et al. |
| 2011/0048792 A1 | 3/2011 | Masaka |
| 2011/0049312 A1* | 3/2011 | Kato .................... F16L 3/222 |
| | | 248/74.1 |
| 2011/0180320 A1 | 7/2011 | Thomas |
| 2012/0104186 A1 | 5/2012 | Shirey et al. |
| 2012/0217033 A1 | 8/2012 | Agusa |
| 2013/0008713 A1* | 1/2013 | Fujioka ............. H01R 13/6273 |
| | | 174/72 A |

(Continued)

*Primary Examiner* — Hoa C Nguyen
*Assistant Examiner* — Stanley Tso
(74) *Attorney, Agent, or Firm* — Brooks Kushman P.C.

(57) ABSTRACT

A wiring carrier is shown and described and can include a plate body on which can be formed a connector mount and a wire securement structures. The wire securement structures can include a wire cradle that is the connector mount. A hatch is configures to engage the wire cradle to secure a wire in the wire cradle. The plate body further can include a connector on the plate and configured to connect the plate to another component. The wire securement structure can also include a flex feature to engage a wire in the cradle or by the hatch.

16 Claims, 9 Drawing Sheets

(56) References Cited

U.S. PATENT DOCUMENTS

2015/0214709 A1\* 7/2015 Landry .................... H02G 3/32
248/74.2

\* cited by examiner

WIRING CARRIER

The present application claims benefit to U.S. Provisional Application No. 62/064,058, filed Oct. 15, 2014, and titled "A Wiring Carrier," the contents of which are hereby incorporated by reference for any purpose.

TECHNICAL FIELD

The following relates to systems and methods for wiring carriers to support wiring connections, e.g., in a vehicle.

BACKGROUND

The increase in the use of electrical components and electronics in many devices has led to the increase in wires and the need to secure wires in the devices. Wiring harnesses and carriers allow for secure repeatable installation of wires in the devices. Such devices can include machines and vehicles, e.g., motor vehicles, aircraft, water vehicles, boats, motorcycles and the like.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as representative basis for teaching one skilled in the art to variously employ the present invention.

Figure 1:
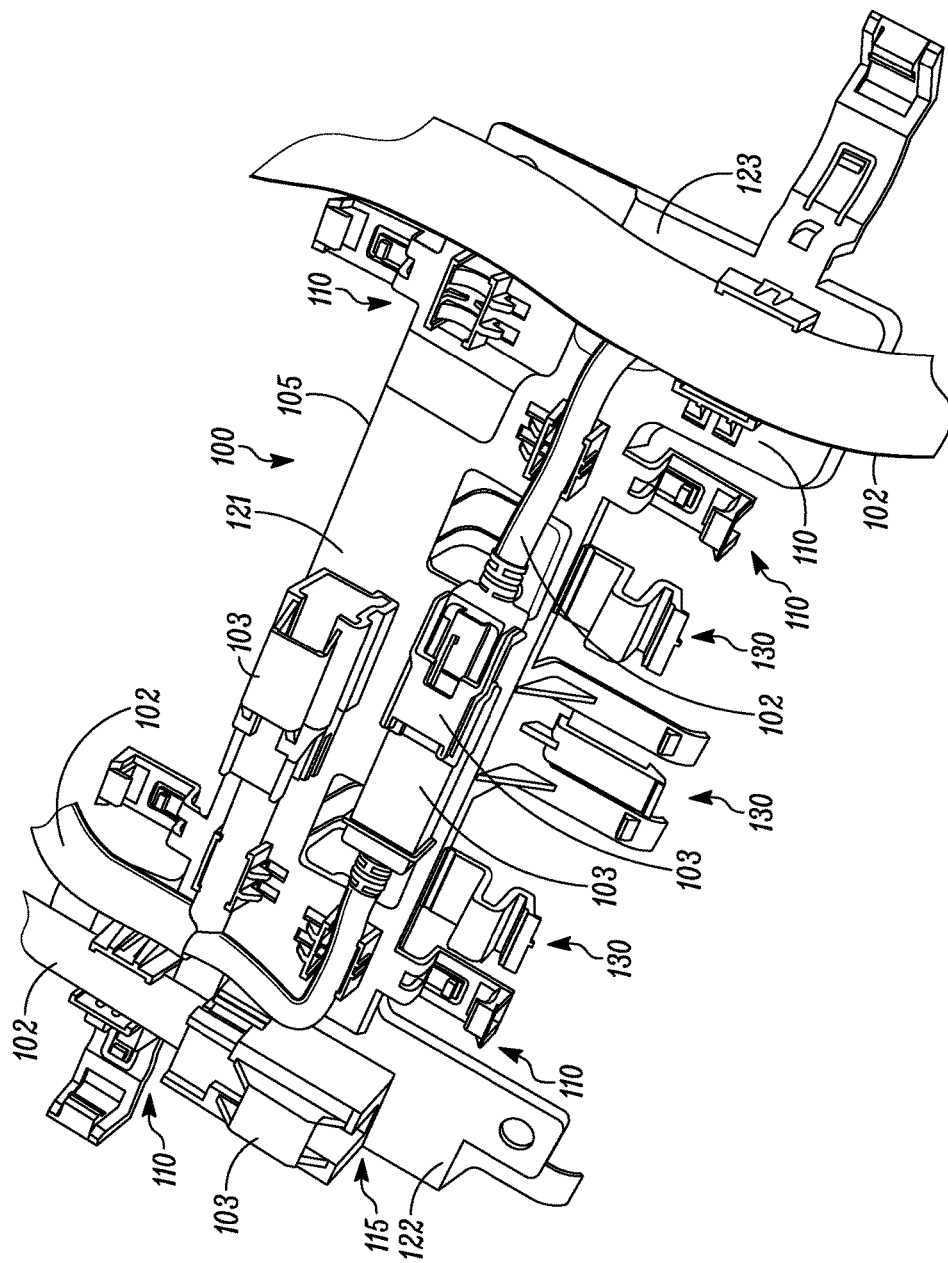
FIG. 1 shows a perspective view of a wire carrier according to embodiments of the present disclosure.

Referring now to FIG. 1, a wiring carrier 100 is shown and on which a plurality of wires 102 and wire connectors 103 can be secured. The wiring carrier 100 includes a main body 105 on which are formed wire securement structures 110 and connector mounts 115. The wire securement structures 110 hold wires 102 in place on the carrier 100 and can operate to reduce stresses on the wires 102 and their associated connectors 103. When used in a consumer device, e.g., a vehicle or automobile, it is desirable to provide for the wires during both the installation of the wires/connectors and the use of the vehicle. The carrier 100 has a generally H-shape with a web 121 joining a first leg 122 to a second leg 123. As shown, the web 121 has a plate configuration and includes connector mounts 115 for two wire connectors 103 and at least four wire securement structures. The wire securement structures align the wires associated with connectors to the connector mounts. The first leg 122 includes a connector mount 115 and a wire securement structure 110. The second leg 123 includes a wire securement structure 110. The connector mounts on the legs 122, 123 generally hold a wire and associated connector non-parallel to the wire and connector on the web 121 of the carrier 100. In an example, the wire and associated connector on either of the legs is essentially perpendicular to any wire and connector on the web 121. In an example, the wire and associated connector on at least one of the legs is skew relative to any wire and connector on the web 121.

In an example, the wire securement structures 110 and connector mounts 115 are on a first side of the main body 105. During connection of the wires/end connectors to the carrier 100, it may be beneficial to have the wires on a single side of the carrier 100. Other securement structures or connections can be placed on the other side of the carrier 100, e.g., the bottom side as shown in FIG. 1. Examples of connections on the other side of the carrier 100 may connect the carrier to support structures in the vehicle.

As shown in FIG. 1, the wire securement structures 110 are open so that wires can be positioned therein. A plurality, here shown as three, of wire connectors is connected to connector mounts with two wire connectors being shown without their mating connectors. As shown, only one of a pair of mating connectors needs to be connected to a connector mount. In an example, both wires to be connected are placed in aligned wire securement structures 110 with at least one of the connectors associated with one of wires is secured to a connector mount 115. The wire connectors are joined and the wires are secured in wire securement structures 110. While in some examples it is preferred to have the illustrated number of wire securement structures 110 and connector mounts 115, it will be understood that the present disclosure is not limited to any specific number of wire securement structures 110 and connector mounts 115. In some examples, the number of wire securement structures 110 and connector mounts 115 are three or more. Each pair of the wire securement structures 110 and connector mounts 115 operates to secure the wire structure to the carrier 100 using at least two fixation locations for each wire/connector assembly.

The wire carrier 100 can also include a plurality of connectors 130 to fix the carrier to another component. The connectors 130 can be snap-type clasps, friction fit fixtures or other fixtures. Connectors 130 can be placed on the bottom side of the carrier 100 in an example as illustrated in FIG. 1. This can provide the most room to include wire securement structures, connector mounts and associated structures on the top side (as shown in FIG. 1) of the carrier.

The wire carrier 100 can be an integrally formed device. The carrier 100 can be formed in a mold using a polymer. In an example, the carrier is formed from a polypropylene. The polypropylene can be talc-filled, e.g., 20% filled, +/−5.0%. The wire carrier 100 can also be electrically non-conductive and hydrophobic.

Figure 2:
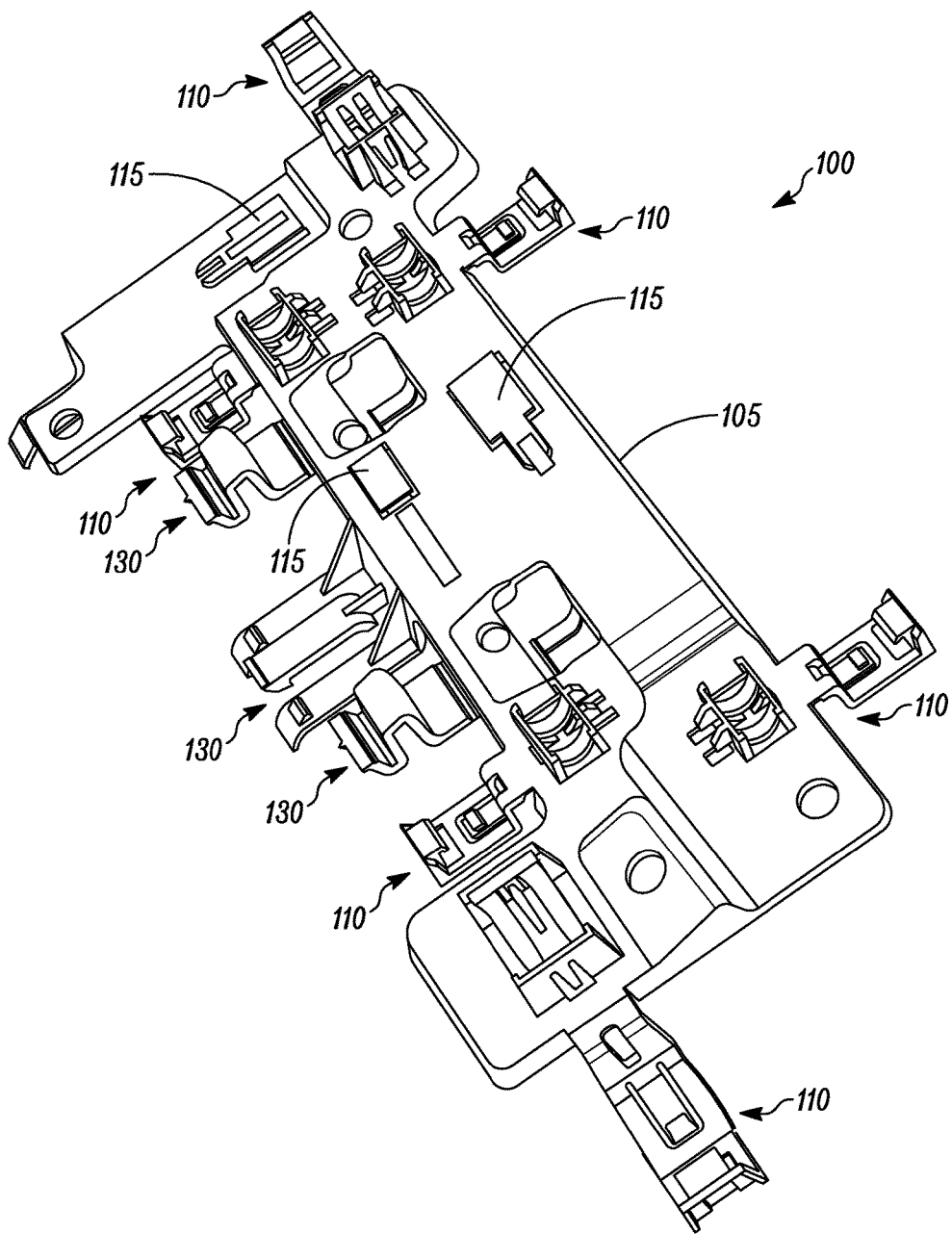
FIG. 2 shows a perspective view of a wire carrier according to embodiments of the present disclosure.

FIG. 2 shows another view of the wire carrier 100 showing the plate 105 with integrally formed structures, e.g., a plurality of wire securement structures 110, a plurality of connector mounts 115, and a plurality of carrier connectors 130, with the wires and connectors removed relative to FIG. 1. The wire securement structures include a cradle 201 and a hatch 203 and are show in the open position to receive a wire and at least some of which can be closed to fix a wire therein. As shown, the wire securement structures 110 can be of different sizes to hold wires of different sizes and gauges therein. In some examples, a wire securement structure 110 may be sized to hold a plurality of wires therein, e.g., at least two wires that are bundled together on one side of the structure and separated on the other side to have their respective connectors fixed to the carrier at different locations.

Figure 3:
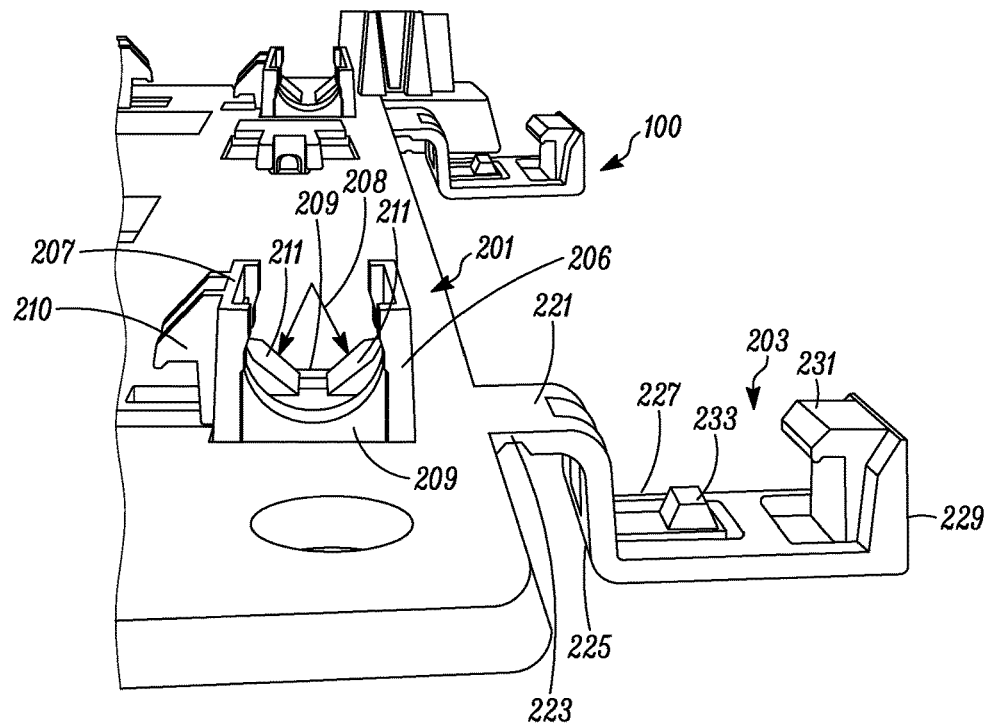
FIG. 3 shows an end view of a wire carrier according to embodiments of the present disclosure.
Figure 4:
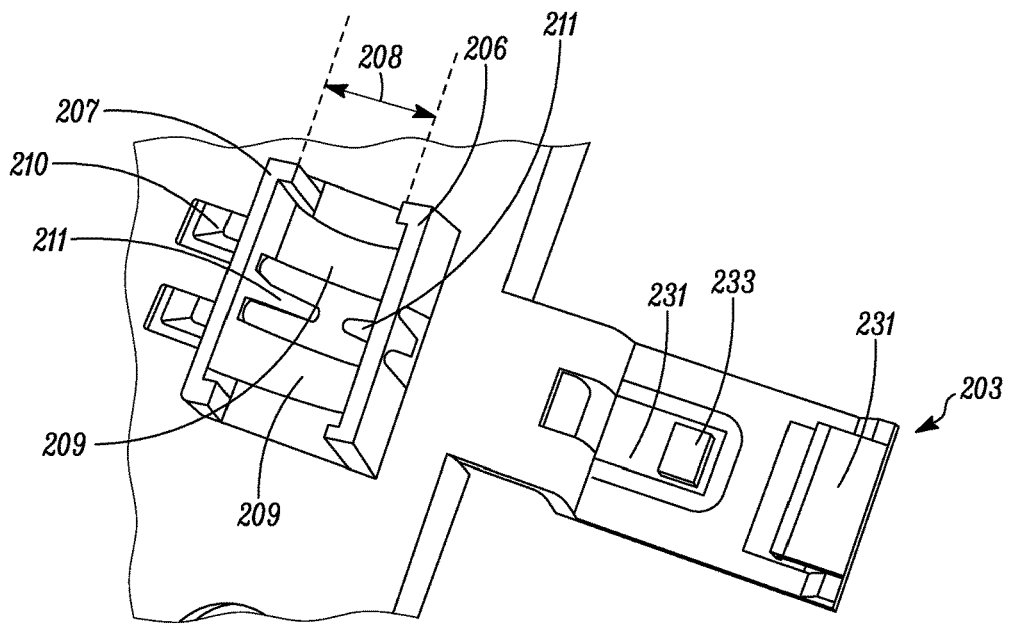
FIG. 4 shows a plan view of a wire cradle and retainer according to embodiments of the present disclosure.

FIG. 3 shows an enlarged, partial end perspective view of the carrier 100 to illustrate the wire securement structure 110. FIG. 4 shows a plan view of the wire securement structure 110 with the cradle 201 and the hatch 203. The cradle 201 is configured to receive a wire, wires or a wire bundle therein. The hatch 203, which is shown in its open position in FIG. 3, is configured to be pivotable to move to a closed position when closing the opening in the cradle 201 to secure a wire in the cradle. The cradle 201 include a first sidewall 206 and a second sidewall 207 that is spaced apart from the first sidewall 206 to form a wire receiving gap 208 therebetween. The gap 208 at the top of the sidewalls is open to receive a wire. Ribs 209 extend across the gap 208 to close the bottom of the gap at the base of the sidewalls 206, 207. Ribs 209 can have an arcuate upper surface facing toward the top of the gap and a generally linear bottom surface that may be recessed slightly below the top surface of the plate 105.

A plurality of flex tabs 211 are positioned to extend into the gap. At least one flex tab 211 is cantilevered from each of the sidewalls 206, 207. In an example, each side wall 206, 207 include an aperture and the flex tabs 211 extend into the aperture. The flex tabs 211 can extend downwardly from a top portion of the respective sidewall 206 or 207. The flex tabs 211 further include a wire contacting portion extends laterally or radially into the gap 208. At least a part of the wire contacting portion extends into the gap beyond the sidewall and the ribs 209 to reduce the diameter or width of the gap. However, when a wire is forced into the cradle, the flex tab(s) 211 can yield to the wire by flexing, which can occur at the joint between the flex tab and the sidewall. In another example, the flex tabs may be cantilevered from the main body of the carrier 100. The sidewalls 206, 207 can serve at least two purposes, defining the lateral edges of the gap to receive a wire and to provide a support for the flex tabs 211. Sidewall 207 further includes a hook fastener 210 that extends outwardly away (leftwardly in FIG. 3) from the gap 208.

The hatch 203 extends from a side of the plate 105 with a first segment 221 that is essentially co-planar with the top surface of the plate. The hatch 203 can be cantilevered from the plate 105. A joint 223 is positioned in the first segment 221. The joint 223 has a thickness less than the reminder of the first segment 221. In an example, the top surface of the first segment 221 with is continuous with a recess in the bottom surface of the first segment 221. This structure will allow the hatch 203 to pivot upwardly and toward the cradle to close the cradle's open top and secure a wire therein in the closed position. A second segment 225 extends from the first segment 221 to a third segment 227. An elongate aperture extends through the length of the second segment 225. The second segment 225 extends essentially perpendicular to the first segment 221. The third segment 227 extends from the second segment 225 to a fourth segment 229. A flex tab 231 is positioned in the third segment 227. Flex tab 231 is cantilevered from an area of the connection of the second and third segments. The flex tab 231 includes a protrusion 233 that extends above the third segment in the open position of the hatch 203. The fourth segment 229 extends upwardly from an outward end of the third segment 227 with a hook fastener 231 that curves leftwardly and downwardly as shown in FIG. 3.

Figure 5:
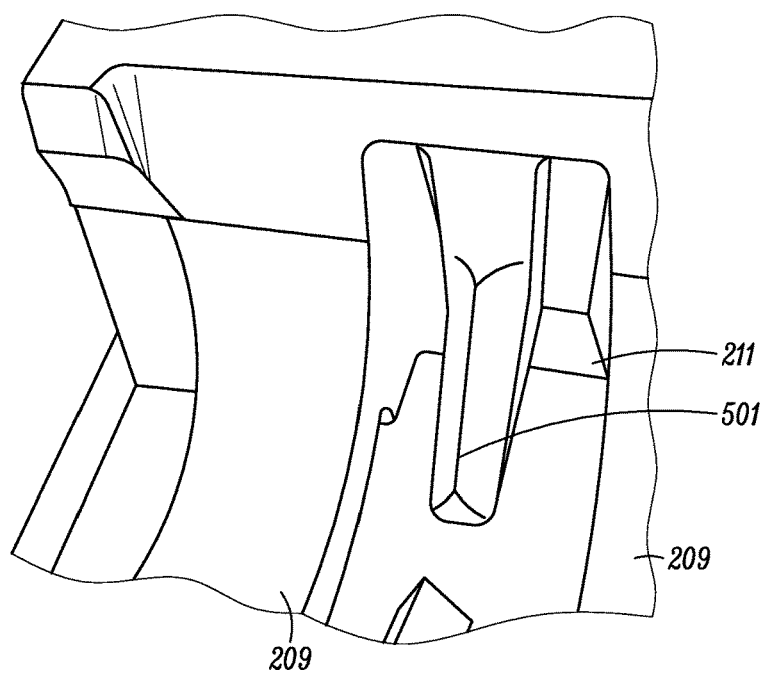
FIG. 5 shows an enlarged view of a wire cradle according to embodiments of the present disclosure.

FIG. 5 is an enlarged view of the cradle 201 to show features of the flex tab 211. The flex tab 211 includes an edge 501 to engage a wire or wire bundle received in the cradle. The edge 501 has a smaller width that the remainder of the flex tab 211. The sharp edge 501 is urged against the wire by the flex action of the flex tab and acts on the wire to minimize or eliminate movement by a mechanical pressure, e.g., friction and/or press fit.

Figure 6:
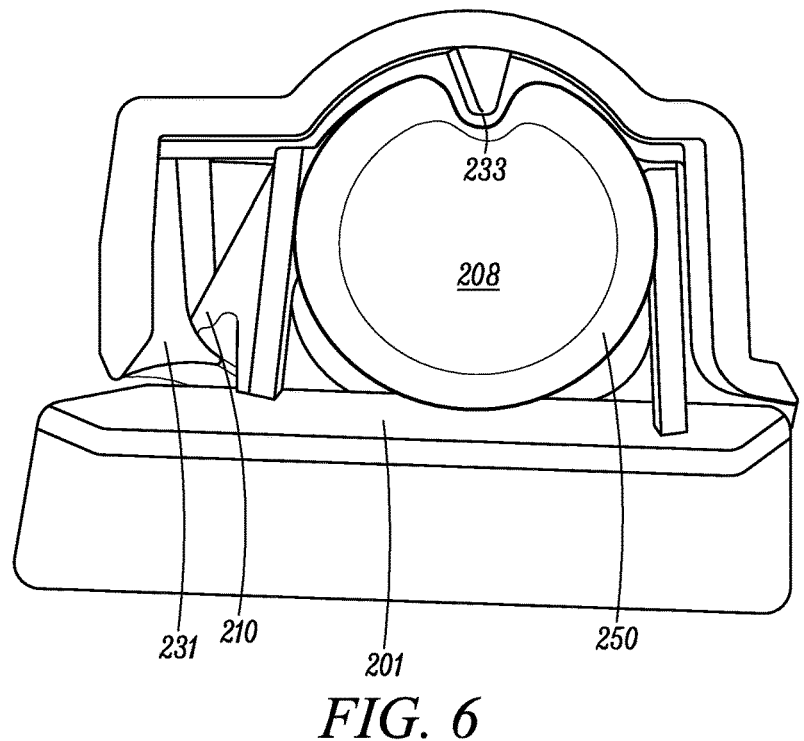
FIG. 6 shows a view of a wire cradle and retainer in a closed position according to embodiments of the present disclosure.

FIG. 6 shows an end view of the carrier 100 to illustrate the wire securement structure 110 in its closed position. The hook fastener 231 of the hatch 203 is engaged with the hook fastener 210 of the cradle 201 to close the cradle 201 with the hatch 203 so as to secure a wire, wires or bundles of wires 250 in the cradle 201. The hook fastener 231 of the hatch 203 pivots with the hatch relative to the cradle 201 so the fourth segment 229 moves past the wall 207 so the hook projection of the fastener 231 passes and engages the protrusion of the hook fastener 210 on the cradle 201.

Wire securement structures 110 that have flex tabs 211, 233 that displace when the bundle or wire is loaded into the cradle 201 allow the structures to accommodate a wider range of bundle diameters. In an example, the flex tabs 211, 233 allows up to 4 mm of tolerance. In other examples, the cradle 201 can accommodate an even larger range, e.g., up to 6 mm or 8 mm+/−1.0 mm.

Figure 7:
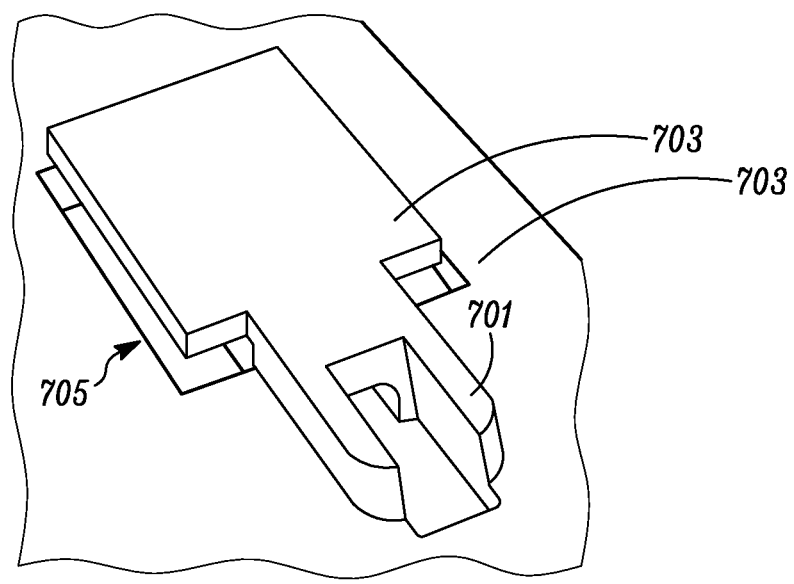
FIG. 7 shows a view of a connector mount according to embodiments of the present disclosure.

FIG. 7 shows a top, perspective view of the connector mount 115 extending upwardly from the plate 105. The connector mount 115 is configured to receive and secure a wire connector onto the carrier 100. A base 701 extends upwardly from the plate 105 to support a connector plate 703 above the main plate 105. An interstice 705 is formed between the upper surface of the main plate 105 and the connector plate 703. A wire connector 103 includes mating structures that match the base 701 and connector plate 703 to secure the connector 103. For example, the connector 103 can have a slot to match the base 701 and recesses to receive the plate 703 with parts of the connector being received in the interstice 705.

Figure 8:
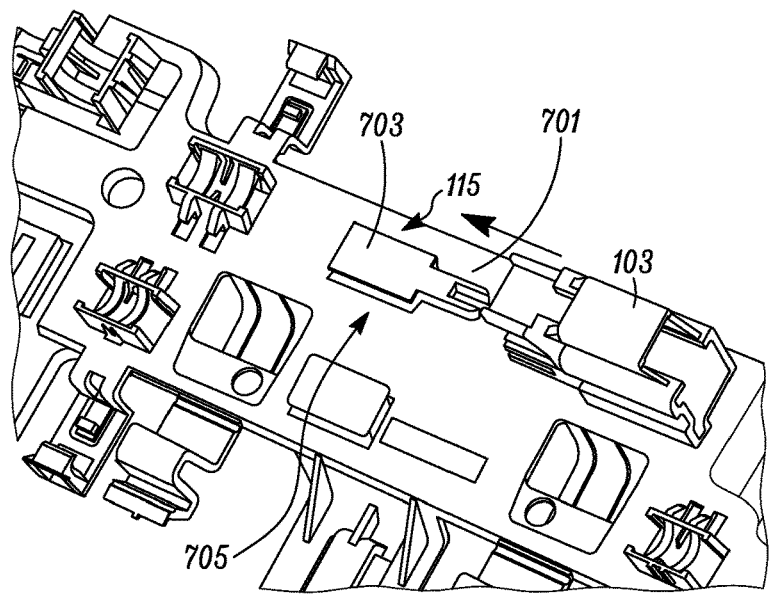
FIG. 8 shows a view of a connector mount receiving a wire connector according to embodiments of the present disclosure.
Figure 9:
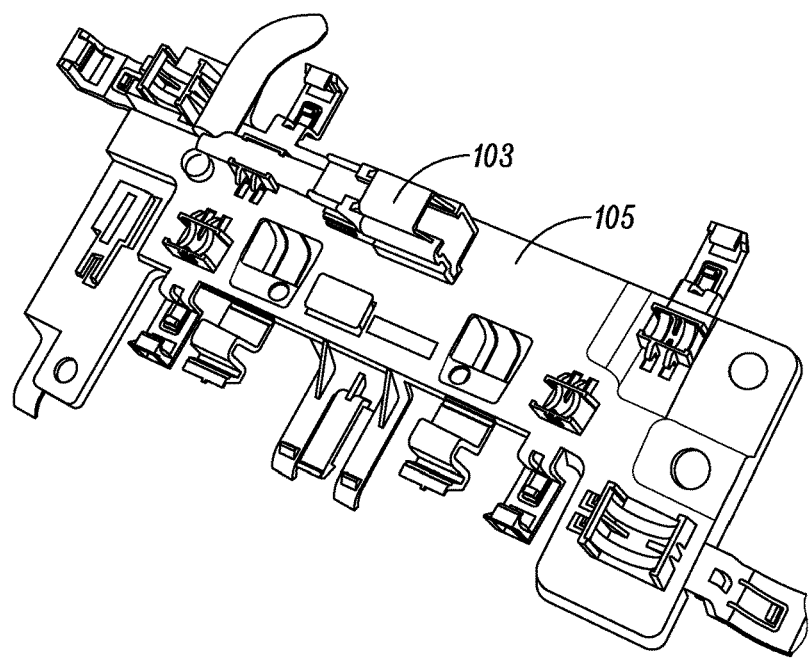
FIG. 9 shows a view of a wire with connector on the connector mount and wire in the wire cradle carrier according to embodiments of the present disclosure.

FIGS. 8 and 9 show the securing of the wire connector 103 to the connector mount 115 in the direction indicated by the arrow, i.e., generally right to left, and the connector 103 being mounted on the mount 115. The connector 103 shows a connection structure on its top that can be similar to the bottom that is engaging the connector mount with a slot to receive the base 701 and recesses to receive the connector plate 703. The connector 103 can be held in place by a friction fit to the connector mount, a detent, or other mechanical fastener.

Figure 10:
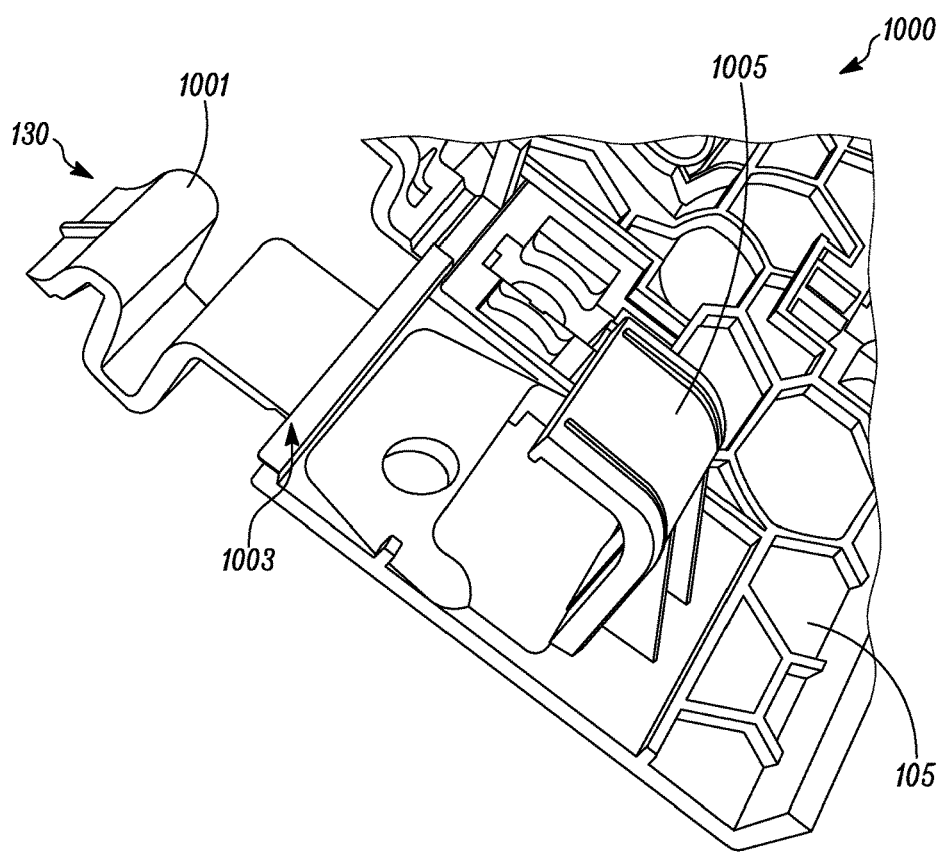
FIG. 10 shows a retainer in a flexed position according to embodiments of the present disclosure.

FIG. 10 shows an enlarged partial view of a connector 130 that can be used to connect the wire carrier 100 to another component, e.g., a vehicle, a seat, a dashboard or in an engine compartment. The FIG. 10 view is of the bottom side of the plate 105 relative to the views described above. The connector 130 is in the open position and has an arm 1001 that extends outwardly from the plate 105. The connector 130 is connected to the plate 105 at a joint 1003, which can be a thinner portion of the material forming both the arm 1001 and the plate 105. The joint 1003 allows the arm 1001 to be pivoted relative to the plate, e.g., upwardly in the FIG. 10 embodiment to engage a receiver 1005 to secure part of a component 1010 between the plate 105 and the arm 1001. The arm 1001 has a bent or z configuration and ends in a latch edge. The bent configuration of the arm 1001 allows some play in the arm when in the closed position while securing the component part therein. For example, the folds in the arm 1001 act as springs that urge the arm 1001 against the component and the receiver 1005. The receiver 1005 extends from the bottom side of the plate 105 and curves toward the arm 1001. A hook edge is at the free end of the receiver 1005 that is adapted to engage the free end of the arm 1001.

Figure 11:
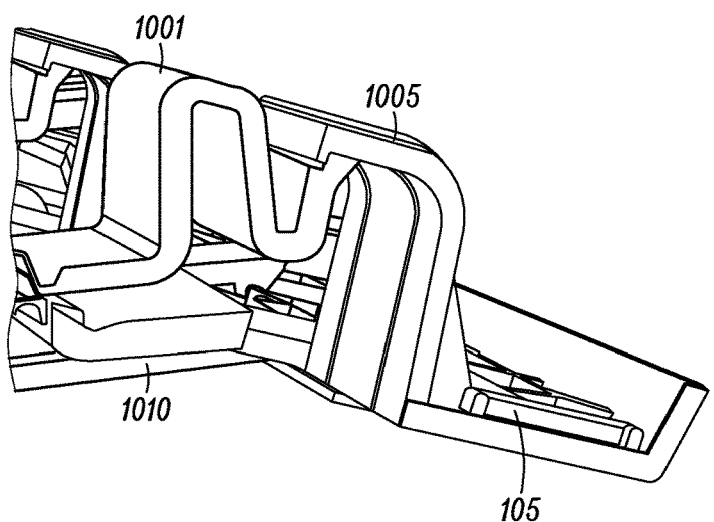
FIG. 11 shows a mating element for a wire cradle according to embodiments of the present disclosure.

FIG. 11 shows the connector 130 in its closed position with the arm 1001 engaged in the receiver 1005 and a part of a component 1010 held between the plate 105 and the arm 1001. The free end of the arm 1001 and the free end of the receiver latch together. When engaged to the receiver 1005, the arm 1001 is pulled slightly from its at rest position to stretch the arm toward the receiver 1005, the arm 1001 then urges its end engaging the receiver against the receiver. The bent configuration of the arm 1001 further allows for variations in the width and size of the component part being held by the arm. The bent arm 1001 configuration allows the arm to yield to component part 1010 while still engaging the receiver 1005.

Figure 12:
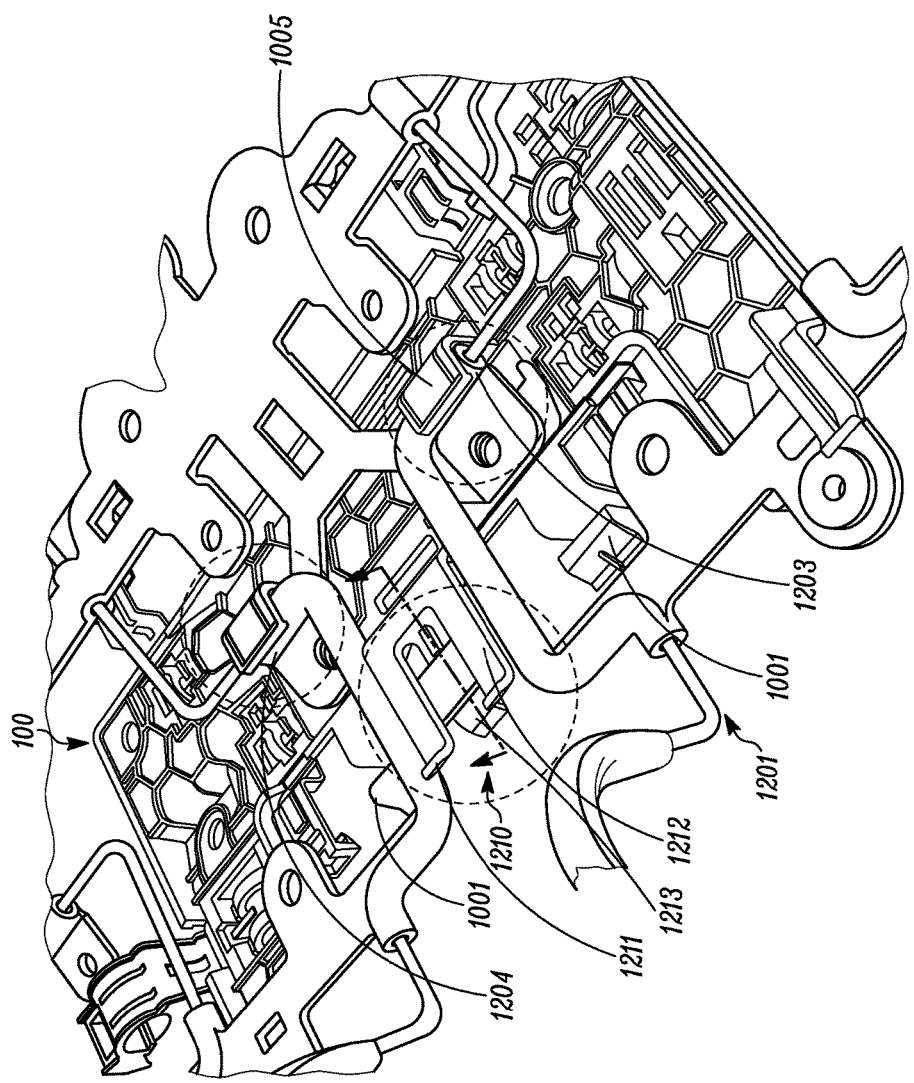
FIG. 12 shows a bottom a perspective view of a wire carrier according to embodiments of the present disclosure.
Figure 13:
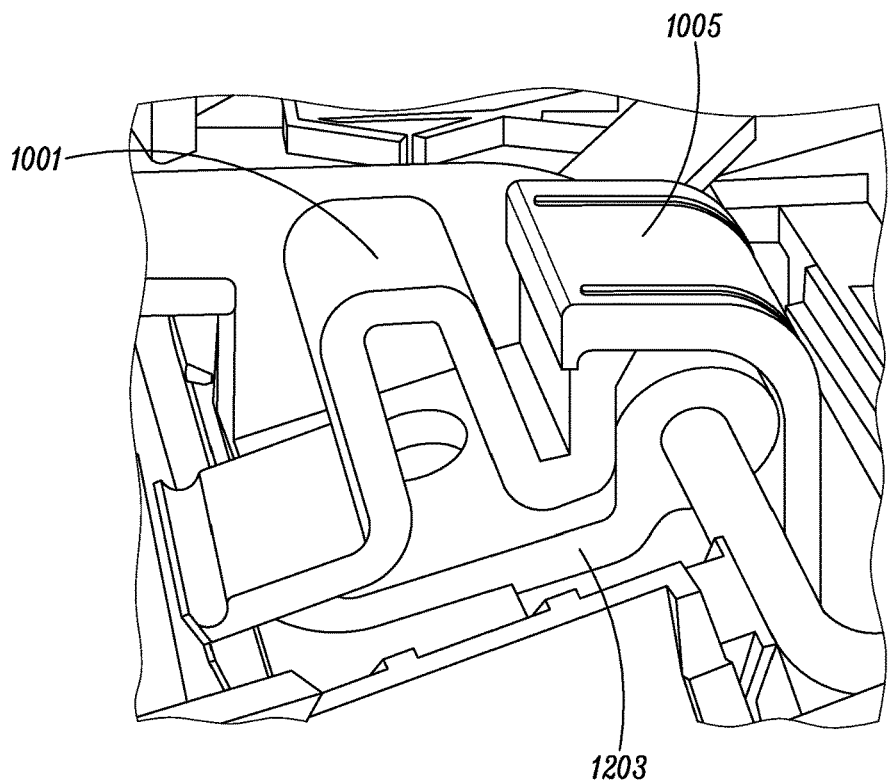
FIG. 13 shows a mating element for a wire cradle, in a closed position, according to embodiments of the present disclosure.
Figure 14:
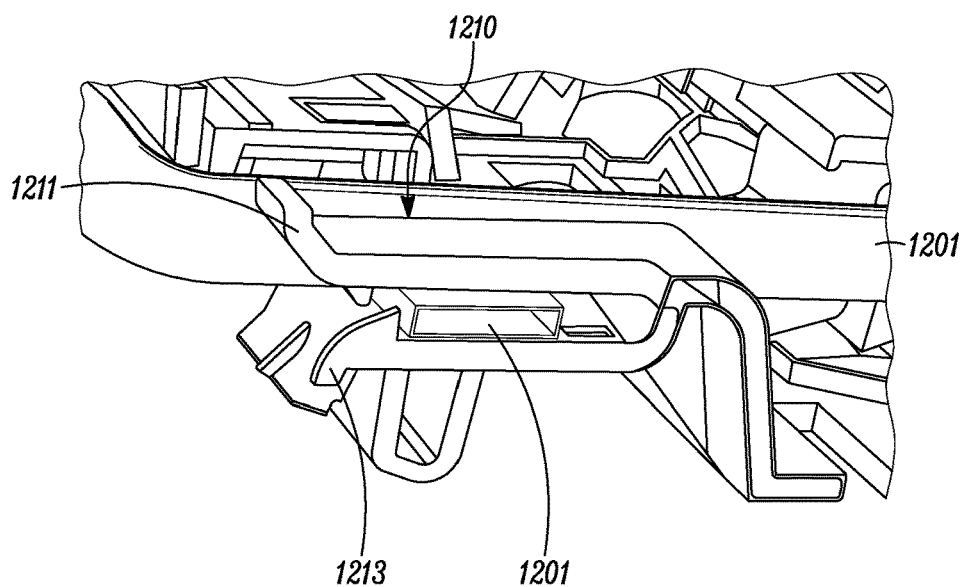
FIG. 14 shows an enlarged view of a retainer for a wire carrier according to embodiments of the present disclosure.

FIG. 12 shows the wiring carrier 100 mounted to a component 1201, here shown as a substrate of a seat, e.g., vehicle seat. The component 1201 can be a suspension mat in a vehicle seat that has a wire part and an overmolded part on the wires. The carrier 100 can be mounted to the wire part or to the overmolded part. As shown parts 1203, 1204 are positioned in receiver 1005. The arms 1001 can then be folded over tabs on the overmolded part, as shown in FIG. 13. The wiring carrier 100 further includes a retainer 1210 that has three fingers 1211, 1212, 1213 with two spaced apart fingers 1211, 1212 on one side and the third finger 1213 intermediate the fingers 1211, 1212. The fingers 1211-1213 are configured to receive a flat part of the component 1201, e.g., a flat part extending between two wires in the suspension. FIG. 14 shows a partial cross sectional view of the retainer 1210 as it is engaging the component 1201.

The wiring carriers described herein can be used in vehicles, e.g., motor vehicles, aircraft, water vehicles, boats, motorcycles and the like. The carrier can be used to connected wires, e.g., those with connectors, in a secure manner at a specified positioned in the vehicle. In an example, the carrier securely supports wires and securely fixes to a component in the vehicle, e.g., a seat or under a dashboard. The carrier can also be positioned in the engine compartment.

Embodiments of carriers may provide many benefits. The carrier can provide for the elimination of up to ten "Christmas tree" type connects on a wiring harness. The wire support structures can include a cradle design can accommodate a large tolerance range of mating components. The carrier can directly mount wire connectors to features on the plate. In various embodiments, the carrier can provide efficient mounting and strain relief The carrier can be modified to accept a wire instead of a wire harness bundle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A wiring carrier comprising:
   a plate;
   at least one connector mount on the plate, the connector mount to receive a wire end connector;
   at least one wire cradle connected to the plate and aligned with the connector mount, the wire cradle being configured to hold a single wire;
   a hatch to engage the wire cradle to secure or retain the single wire in the wire cradle with the single wire being open on the plate apart from the hatch and the wire cradle, wherein the hatch includes a first latch element and the wire cradle includes a second latch element configured to engage the first latch element to close the wire cradle and secure the single wire between a cradle flex tab and a hatch flex tab, wherein the first latch element includes a pawl with a protrusion at a free end of the pawl and the second latch element includes a latch edge configured to receive the protrusion to secure the pawl to the latch edge; and
   a connector on the plate and configured to connect the plate to another component;
   wherein the hatch includes a main body integrally formed with the plate and the hatch flex tab is cantilevered from the main body of the hatch,
   wherein the cradle includes a body integrally formed with the plate and the cradle flex tab is cantilevered from the body of the cradle, and
   wherein the hatch flex tab and the cradle flex tab extend inwardly past a sidewall of the hatch and a sidewall of the cradle, respectively, with the hatch in a closed position relative to the wire cradle.

2. The wiring carrier of claim 1, wherein the wire cradle includes at least one, yieldable cantilevered cradle flex tab to engage the wire in the wire cradle.

3. The wiring carrier of claim 2, wherein the hatch includes at least one, yieldable cantilevered hatch flex tab to engage the wire in the wire cradle and move with the wire contacting the hatch flex tab when in the wire cradle.

4. The wiring carrier of claim 3, wherein the hatch flex tab includes a body having a tab body width and a wire engaging edge that has a width less than the tab body width and the hatch includes a hatch body with an aperture that is wider than the tab body width, the hatch flex tab being cantilevered from the hatch body into the aperture of the hatch body; and
   wherein the wire cradle includes a cradle body with an aperture and the cradle flex tab extends into the aperture of the cradle body.

5. The wiring carrier of claim 3, wherein the hatch flex tab of the hatch urges the wire against the cradle flex tab of the cradle.

6. The wiring carrier of claim 1, wherein the hatch is integral with the plate and is bent over only a portion of a main part of the plate at the cradle to engage the wire cradle when securing a wire therebetween.

7. The wiring carrier of claim 1, wherein the plate integrally includes a snap tab on a side opposite the cradle, wherein the plate includes a mating feature, the snap tab folds to engage the mating feature to secure another component between the plate and the snap tab.

8. The wiring carrier of claim 7, wherein, the mating feature includes an edge that prevents the snap tab from releasing from the mating feature.

9. The wiring carrier of claim 1, wherein, the carrier includes at least three snap tabs with at least one folding back onto the plate in a direction that is different from at least one of the other two snap tabs.

10. The wiring carrier of claim 9, wherein at least two of the snap tabs fold back toward each other.

11. The wiring carrier of claim 9, wherein the snap tabs fold to one side of the plate and the connector mount receives a wire connector on the other side of the plate.

12. The wiring carrier of claim 11, wherein the cradle is on the other side of the plate.

13. The wiring carrier of claim 1, wherein the another component is a vehicle seat, a seat, a seat substructure or a support structure in a vehicle seat.

14. A wiring carrier comprising:
a plate having a first side and a second side;
at least one wire connector mount on the first side of the plate;
at least one wire cradle connected to the plate on the first side and aligned with the connector mount, the wire cradle configured linearly align a single wire with the wire connector mount to receive a wire end connector of the single wire with the single wire extending linearly in the wire cradle to the connector mount, the wire cradle including at least one first flex tab to engage a wire in the wire cradle;
a hatch to engage the wire cradle to secure or retain the wire in the wire cradle, the hatch being integral with the plate and is bent over the first side of the plate to engage the wire cradle when securing the wire therebetween, the hatch including at least one second flex tab to engage the wire in the cradle, wherein the hatch includes a first latch element and the wire cradle includes a second latch element configured to engage the first latch element to close the wire cradle and secure the wire between a first flex tab and the second flex tab, wherein the first latch element includes a pawl with a protrusion at a free end of the pawl and the second latch element includes a latch edge configured to receive the protrusion to secure the pawl to the latch edge; and
a connector on the second side of the plate and configured to connect the plate to another component;
wherein the second flex tab includes a body and a wire engaging edge that has a width less than a width of the body of the second flex tab;
wherein the hatch includes a first latch element and the cradle includes a second latch element configured to engage the first latch element to close the cradle and secure a wire between the first and second flex tabs with the wire being open on the first side of the plate apart from the hatch; and
wherein the hatch includes a main body integrally formed with the plate and the second flex tab is cantilevered from the main body of the hatch,
wherein the cradle includes a body integrally formed with the plate and the first flex tab is cantilevered from the body of the cradle, and
wherein the second flex tab and the first flex tab extend inwardly past a sidewall of the hatch and a sidewall of the cradle, respectively, with the hatch in a closed position relative to the cradle.

15. The wiring carrier of claim 14, wherein, the wire carrier includes a plurality of snap taps with at least one folding back onto the plate in a direction that is different from at least two other snap tabs, which fold back toward each other.

16. A wiring carrier comprising:
a plate having a first side to secure wires and a second side to fix the wiring carrier to a vehicle component;
a first connector mount on the first side of the plate, the first connector mount to receive a first wire end connector of a first wire;
a second connector mount on the first side of the plate, the second connector mount to receive a second wire end connector of a second wire;
a first wire cradle integrally formed on the first side of the plate, aligned with the first connector mount connected to the plate, and configured to hold only the first wire linearly aligned with the first connector mount, the first wire cradle including a pair of first flex tabs to yieldable engage the first wire;
a first hatch to engage the first wire cradle to retain the first wire in the first wire cradle, the first hatch including a second flex tab to yieldable engage the first wire with the first hatch in a closed position to secure the first wire in the first wire cradle and with the second flex tab being on the first wire remote from the pair of first flex tabs, wherein the first hatch includes a first latch element, wherein the first wire cradle includes a second latch element configured to engage the first latch element to close the first wire cradle and secure the wire between the pair of first flex tabs and the second flex tab, wherein the first latch element includes a pawl with a protrusion at a free end of the pawl and the second latch element includes a latch edge configured to receive the protrusion to secure the pawl to the latch edge;
a second wire cradle integrally formed on the first side of the plate, aligned with the second connector mount connected to the plate, and configured to hold only the second wire linearly aligned with the second connector mount, the second wire cradle being separate and skew relative to the first wire cradle, the second wire cradle including a pair of third flex tabs to yieldable engage the second wire, the second wire cradle being separate from the first wire cradle;
a second hatch to engage the second wire cradle to retain the second wire in the second wire cradle, the second hatch including a fourth flex tab to yieldable engage the second wire with the second hatch in a closed position to secure the second wire in the second wire cradle and with the fourth flex tab being on the second wire remote from the pair of third flex tabs, the second hatch being separate from the first hatch; and
the plate supporting the first wire and the second wire with a portion of the first wire and the second wire being open on the first side of the plate with the first wire retained in the first wire cradle by the first hatch and the second wire retained in the second wire cradle by the second hatch;
wherein the first hatch includes a main body integrally formed with the plate and the second flex tab is cantilevered from the main body of the first hatch, wherein the first wire cradle includes a body integrally formed with the plate and the first flex tab is cantilevered from the body of the first wire cradle, and wherein the hatch flex tab and the cradle flex tab extend inwardly past a sidewall of the hatch and a sidewall of the first wire cradle, respectively, with the first hatch in a closed position relative to the first wire cradle.

\* \* \* \* \*